United States Patent
Ohga et al.

[11] Patent Number: 5,238,479
[45] Date of Patent: Aug. 24, 1993

[54] METHOD FOR PRODUCING POROUS GLASS PREFORM FOR OPTICAL FIBER

[75] Inventors: Yuichi Ohga; Toshio Danzuka; Hiroo Kanamori; Hiroshi Yokota, all of Yokohama, Japan

[73] Assignee: Sumitomo Electric Industries, Ltd., Osaka, Japan

[21] Appl. No.: 984,734

[22] Filed: Dec. 4, 1992

Related U.S. Application Data

[63] Continuation of Ser. No. 568,779, Aug. 17, 1990, abandoned.

[30] Foreign Application Priority Data

Aug. 28, 1989 [JP] Japan ................... 1-218599

[51] Int. Cl.$^5$ .......................................... C03B 37/018
[52] U.S. Cl. ........................................ 65/3.12; 65/3.2; 65/13
[58] Field of Search ............ 65/3.12, 3.2, 13, 18.2, 65/18.3, 144, 157

[56] References Cited

U.S. PATENT DOCUMENTS

| | | | |
|---|---|---|---|
| 4,406,684 | 9/1983 | Kawachi et al. | |
| 4,421,540 | 12/1983 | Nakahara | 65/3.12 |
| 4,618,354 | 10/1986 | Suda | 65/3.12 |
| 4,714,488 | 12/1987 | Powers | 65/13 |
| 4,801,322 | 1/1989 | Suda et al. | |
| 4,826,520 | 5/1989 | Kawazoe | 65/3.12 |

FOREIGN PATENT DOCUMENTS

| | | |
|---|---|---|
| 62-87428 | 4/1987 | Japan. |
| 62-252334 | 4/1988 | Japan. |
| 62-297238 | 6/1988 | Japan. |

Primary Examiner—Robert L. Lindsay
Attorney, Agent, or Firm—Cushman, Darby & Cushman

[57] ABSTRACT

The invention is a method for producing a porous preform for use in the fabrication of an optical fiber at least two burners synthesize glass soot particles, one of which generates a double-layer flame and one of which is used for forming a core part of the preform. The method comprises the steps of supplying $SiCl_4$ and optionally $GeCl_4$ to the inner flame of the double-layer flame, and only $SiCl_4$ to an outer flame of the double-layer flame to flame hydrolyze the supplied compounds and synthesize glass soot particles. Compounds $SiCl_4$ and $GeCl_4$ as glass-forming raw materials are supplied to the burner for forming the core part of the preform by depositing the generated glass soot particles on the lower end of a rotating starting member. The generated porous preform comprises a core part containing at least partly $GeO_2$, and a surface having a low concentration of $GeO_2$ which reduces cracking or peeling.

3 Claims, 2 Drawing Sheets

METHOD FOR PRODUCING POROUS GLASS PREFORM FOR OPTICAL FIBER

This is a continuation of application Ser. No. 07/568,779, filed on Aug. 17, 1990, which was abandoned upon the filing hereof.

BACKGROUND OF THE INVENTION

1. Field of the Invention

The present invention relates to a method for producing a porous glass preform for use in the fabrication of an optical fiber (herein after referred to as "porous preform").

2. Description of the Related Art

Known methods for producing a preform for use in the fabrication of quartz based optical fiber include an inside chemical vapor deposition (CVD) method, an OVD method and a VAD method.

For example, the VAD method is suitable for economically producing a preform for use in the fabrication of an optical fiber having low transmission loss, an arbitrary refractive index profile in the diameter direction and a homogenous composition in peripheral and lengthwise directions.

FIG. 1 shows a conventional embodiment of the VAD method for producing a quartz base preform. The porous preform 11 is grown from a lower end of a rotating starting member 10 with a soot stream 12 generated by an oxyhydrogen burner 13. An exhausting tube 14 removes undeposited soots.

For example, a multi-port burner having a cross section shown in FIG. 2 is used as the oxyhydrogen burner 13. A glass-forming raw material is supplied from a center port 1, hydrogen gas ($H_2$) is supplied from second and sixth ports 2 and 6, oxygen gas ($O_2$) is supplied from fourth and eighth ports, and argon gas (Ar) is supplied from third, fifth and seventh ports (namely, in the order of hydrogen, argon, oxygen, argon, hydrogen, argon and oxygen) to generate a double-layer flame. In the oxyhydrogen flame, the glass-forming raw material is flame hydrolyzed to generate glass soot particles. Then, the glass soot particles are deposited on a lower end of the rotating starting member 10 such as a glass rod, and a cylinder-form mass of glass soot particles, namely the porous preform 11 is grown in a direction of the axis of the starting member 10. Thereafter, the porous preform is heated and consolidated to obtain a transparent glass preform.

By the above VAD method, it is easy to produce a large size preform with good productivity. Therefore, the VAD method is widely used in the optical fiber industry.

In the above VAD method which utilizes the double-layer flame and produces a porous preform having a desired refractive index profile at a high production rate, if the glass-forming raw material contains a compound such as $GeCl_4$ which is added to the porous preform in the form of $GeO_2$, a layer containing $GeO_2$ at a high concentration is formed on the surface of porous preform. The surface of the sintered preform which is obtained by heating and vitrifying the porous preform tends to be cracked due to difference of coefficients of thermal expansion between the inside and the surface of the preform.

Table shows a relationship between a $GeO_2$ concentration at the surface of porous preform and cracks of the sintered preform. As seen from Table, the $GeO_2$ concentration at the surface of porous preform should be not larger than 5.0% by weight.

TABLE

| $GeO_2$ concentration at the surface of porous preform | Condition of sintered preform |
| --- | --- |
| 5.0% by weight | Good |
| 15.0% by weight | A few cracks are formed on the surface |
| 21.0% by weight | The surface layer is peeled off |

SUMMARY OF THE INVENTION

An object of the present invention is to provide an improved VAD method for producing a porous preform, which does not suffer from the above drawbacks.

According to the present invention, there is provided a method for producing a porous preform for use in the fabrication of an optical fiber with at least two burners for synthesizing glass soot particles at least one of which generates a double-layer flame and at least one of which is used for forming a core part of the preform, which method comprises steps of:

supplying $SiCl_4$ and optionally $GeCl_4$ to an inner flame of the double-layer flame, and $SiCl_4$ to an outer flame of the double-layer flame to flame hydrolyze the supplied compounds to synthesize glass soot particles, supplying $SiCl_4$ and $GeCl_4$ as glass-forming raw materials to the burner for forming the core part to flame hydrolyze the supplied compound to synthesized glass soot particles and depositing the generated glass soot particles on the lower end of a rotating starting member and growing the porous preform in a direction of an axis of the starting member to produce the porous preform comprising a core part containing at least partly $GeO_2$.

As a result of extensive study for solving the above problems of the conventional VAD method, it has been found that a cause for the formation of the exterior surface layer having a high $GeO_2$ concentration is attributed to the phenomenon that undeposited $SiO_2$ particles and $GeO_2$ particles contained in a stream along the surface of already deposited porous preform react with each other in the inner flame of the double-layer flame generated by the multi-port burner. Resulting in $GeO_2$ doped $SiO_2$ in the solid solution form.

Thus, a measure for preventing diffusion of the stream of undeposited particles in the inner flame is sought. It has been found that it is effective to supply the glass-forming material to the outer flame to act as a boundary to reduce dispersion of the $GeO_2$ in the inner flame in addition to the inner flame.

DETAILED DESCRIPTION OF THE DRAWINGS

The present invention will be explained in detail by making reference to the accompanying drawings.

Figure 1:
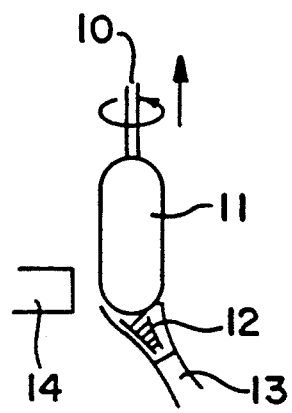
FIG. 1 schematically shows a conventional VAD method.
Figure 3:
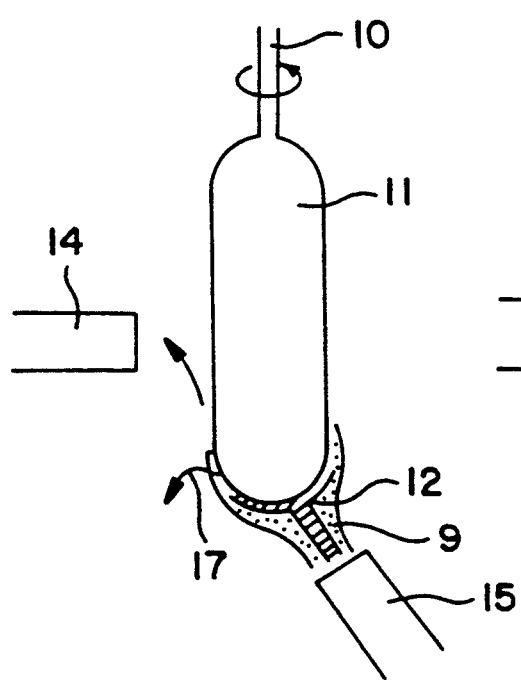
FIGS. 3 and 4 schematically show two preferred embodiments of the method of the present invention.

FIG. 3 schematically shows one embodiment of the method of the present invention. The same numerals stand for the same elements as in FIG. 1. Numeral 9 stands for an outer flame forming soot stream, 12 stands for an inner flame forming soot stream, and 15 stands for a multi-port burner for supplying glass-forming raw materials.

Although the outer flame forming soot stream reaches the surface of an already deposited area of the porous preform, 70% of said stream does not contribute to the deposition of the glass soot particles but acts to generate the turbulent flow to contain the inner flame and reduce the concentration of $GeO_2$ reaching the periphery of the flame and reduce deposition of $GeO_2$ on the surface of the preform.

The glass-forming raw materials, $SiCl_4$ and $GeCl_4$ are typical. However, other compounds such as $TiCl_4$, $AlCl_3$, $PbCl_3$ and $POCl_3$ may be added to the glass-forming raw material.

Figure 4:
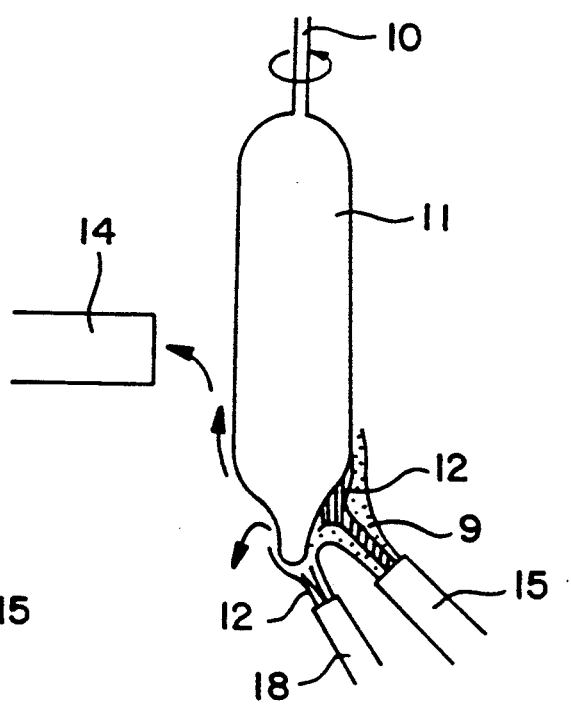

Although, in the above embodiment of FIG. 3, one multi-port burner is used for synthesizing the glass soot particles, it is possible to use at least two burners for synthesizing the glass soot particles as shown in FIG. 4.

In FIG. 4, the first burner 18 for synthesizing the glass soot particles is used to form a center (core) part of the porous preform 11, while the second burner 15 is used for forming a peripheral (cladding) part of the porous preform 11. One or both of the burners can be multi-port burners. For example, when the first burner 18 is a usual burner for generating a single flame and the second burner 15 is a multi-port burner for generating a double-layer flame, $SiCl_4$ and $GeCl_4$ are supplied to the first burner as the glass-forming raw materials, and $SiCl_4$ and $GeCl_4$ are supplied to the outer flame of the burner 15, only $SiCl_4$ is supplied to the outer flame of the second burner 15. Alternatively, $SiCl_4$ and $GeCl_4$ are supplied to the flame of the front burner 18, and, only $SiCl_4$ is supplied to both the outer and inner flames of the second burner 15.

Figure 2:
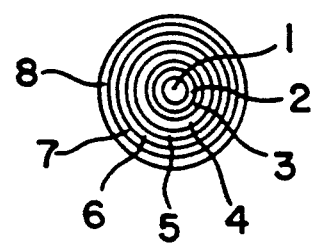
FIG. 2 is a cross sectional view of a multi-port burner.

In place of the cylindrical multi-port burner as shown in FIG. 2, a multi-port burner having other cross section such as a square or an ellipse may be used.

The supply rates of the glass forming materials can be easily determined by the skilled person in the art depending on the desired content of $GeO_2$ in the porous preform. Typical supply rates are explained in the following Examples.

The porous preform can be dehydrated and vitrified by conventional methods to give a transparent glass preform from which an optical fiber is drawn.

PREFERRED EMBODIMENTS OF THE INVENTION

The following Examples illustrate the method of the present invention.

EXAMPLE 1

By using the apparatus as shown in FIG. 3 and an eight-port burner as the burner 15, a porous preform was produced.

To the first port 1 of the burner 15, $SiCl_4$, $GeCl_4$ and argon gas as a carrier gas were supplied at rates of 400 cc/min., 40 cc/min. and 450 cc/min., respectively.

To the second and sixth ports 2 and 6, hydrogen gas was supplied at rates of 3.0 liter/min. and 33 liter/min., respectively.

To the fourth and eighth ports 4 and 8, oxygen gas was supplied at rates of 17 liter/min. and 22 liter/min., respectively.

To the third, fifth and seventh ports 3, 5 and 7, argon gas as a sealing gas was supplied at rates of 3 liter/min., 45 liter/min. and 4 liter/min., respectively.

Further, as the raw material for the outer flame, $SiCl_4$ and argon carrier gas were supplied to the sixth port at rates of 120 cc/min. and 100 cc/min., respectively.

Under the above conditions, the porous preform having a length of 500 mm was grown. The porous preform was heated and dehydrated in a carbon resistance furnace at 1000° C. in an atmosphere of a $Cl_2$/helium mixture in a molar ratio of 0.01/1 and then vitrified at 1600° C. in a helium atmosphere to give a transparent glass preform.

Observation of the surface of transparent glass preform revealed that no crack was formed on its surface.

Thereafter, the glass preform was drawn to a diameter of 10 mm and inserted in a commercially available quartz tube having an outer diameter of 26 mm. From the outside of the tube, the composite was heated with an oxyhydrogen flame to integrated them to obtain a GI type preform. Then, the GI type preform was drawn with a drawing furnace to fabricate an optical fiber. Its transmission loss was as low as 0.43 dB/km at a wavelength of 1.3 μm.

COMPARATIVE EXAMPLE 1

In the same manner as in Example 1 but supplying no $SiCl_4$ to the sixth port, the porous preform having a length of 500 mm was grown and vitrified. The surface of the transparent glass form was cracked and no good preform was produced.

EXAMPLE 2

By using the apparatus as shown in FIG. 3 and an eight-port burner as the burner 15, a porous preform was produced.

To the first port 1 of the burner 15, $SiCl_4$, $GeCl_4$ and argon gas as a carrier gas were supplied at rates of 320 cc/min., 120 cc/min. and 420 cc/min., respectively.

To the second and sixth ports 2 and 6, hydrogen gas was supplied at rates of 5.0 liter/min. and 10 liter/min., respectively.

To the fourth and eighth ports 4 and 8, oxygen gas was supplied at rates of 16 liter/min. and 20 liter/min., respectively.

To the third, fifth and seventh ports 3, 5 and 7, argon gas as a sealing gas was supplied at rates of 2 liter/min., 4 liter/min. and 4 liter/min., respectively.

Further, as the raw material for the outer flame, $SiCl_4$ and argon carrier gas were supplied to the sixth port at rates of 15 cc/min. and 10 cc/min., respectively.

Under the above conditions, the porous preform having a length of 400 mm was grown. The porous preform was heated and vitrified in a carbon resistance furnace in a helium atmosphere to give a transparent glass preform.

Observation of the surface of transparent glass preform revealed that no crack was formed on its surface.

Figure 5:
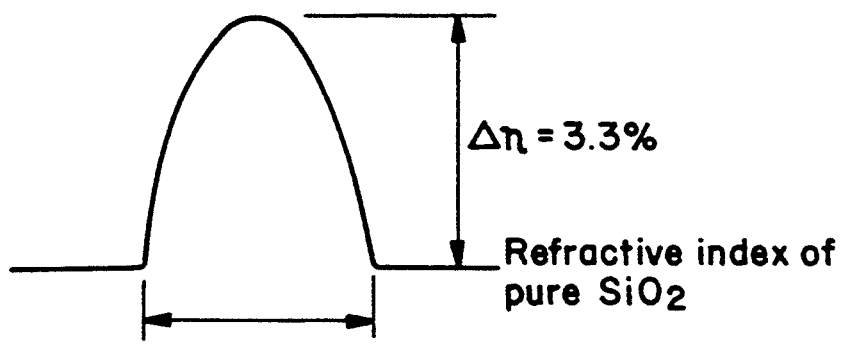
FIGS. 5 and 6 show refractive index profiles of the optical fibers fabricated from the preforms which were produced in Examples 2 and 3, respectively.

Thereafter, the glass preform was drawn to a diameter of 15 mm and inserted in a commercially available quartz tube having an outer diameter of 26 mm. From the outside of the tube, the composite was heated with an oxyhydrogen flame to integrated them to obtain a preform, a refractive index profile of which is shown in FIG. 5. The preform produced in this Example is suitable as a large NA preform.

COMPARATIVE EXAMPLE 2

In the same manner as in Example 2 but supplying no SiCl₄ to the sixth port, the porous preform having a length of 400 mm was grown and vitrified. The surface of the transparent glass form was minutely cracked and no good preform was produced.

EXAMPLE 3

By using the apparatus as shown in FIG. 4, and a four-port burner as the burner 18 for forming the core portion and an eight-port burner as the burner 15 for forming a cladding portion, a porous preform was produced.

To the first port 1 of the burner 18, SiCl₄, GeCl₄ and argon gas as a carrier gas were supplied at rates of 120 cc/min., 15 cc/min. and 180 cc/min., respectively.

To the second port 2 of the burner 18, hydrogen gas was supplied at a rate of 3.0 liter/min.

To the third port 3 of the burner 18, argon gas as a sealing gas was supplied at a rate of 2.0 liter/min.

To the fourth port 4 of the burner 18, oxygen gas was supplied at a rate of 5.0 liter/min.

To the first port 1 of the burner 15, SiCl₄, GeCl₄ and argon gas as a carrier gas were supplied at rates of 800 cc/min., 20 cc/min. and 800 cc/min., respectively.

To the second and sixth ports 2 and 6 of the burner 15, hydrogen gas was supplied at rates of 3.5 liter/min. and 40 liter/min., respectively.

To the fourth and eighth ports 4 and 8 of the burner 15, oxygen gas was supplied at rates of 17 liter/min. and 27 liter/min., respectively.

To the third, fifth and seventh ports 3, 5 and 7 of the burner 15, argon gas as a sealing gas was supplied at rates of 3 liter/min., 4 liter/min. and 4 liter/min., respectively.

Further, as the raw material for the outer flame, SiCl₄ and argon carrier gas were supplied to the sixth port of the burner 15 at rates of 120 cc/min. and 100 cc/min., respectively.

Under the above conditions, the porous preform having a length of 500 mm was grown. The porous preform was heated and dehydrated in a carbon resistance furnace at 1000° C. in an atmosphere of a Cl₂/helim mixture in a molar ratio of 0.01/1 and then vitrified at 1600° C. in a helium atmosphere to give a transparent glass preform.

Observation of the surface of transparent glass preform revealed that no crack was formed on its surface.

Figure 6:
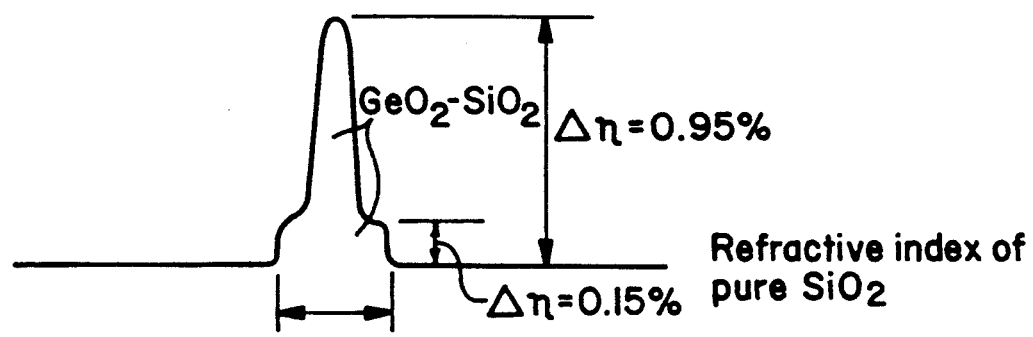

Thereafter, the glass preform was drawn to a diameter of 5 mm and inserted in a pure SiO₂ tube made by the VAD method and having an outer diameter of 51 mm. From the outside of the tube, the composite was heated with a carbon resistance furnace to integrated them to give a preform for a 1.55 μm band dispersion shifted optical fiber. Then, the preform was drawn in a drawing furnace to fabricate an optical fiber. Its transmission loss was as low as 0.21 dB/km at a wavelength of 1.55 μm. A refractive index profile of the optical fiber is shown in FIG. 6.

COMPARATIVE EXAMPLE 3

In the same manner as in Example 3 but supplying no SiCl₄ to the sixth port of the burner 15, the porous preform having a length of 500 mm was grown and vitrified. The surface layer of the transparent glass form was peeled off and no good preform was produced.

What is claimed is:

1. A method for producing an optical fiber porous preform having a center core comprising SiO₂ and GeO₂ and a peripheral layer comprising SiO₂ and GeO₂, wherein the peripheral layer has a GeO₂ concentration which is smaller than that of the center core, comprising the steps of:
   (a) synthesizing glass soot particles from a first double-layer flame burner to form a surface of the preform by:
      (i) supplying SiCl₄ and GeCl₄ to an inner flame of the first double layer flame burner; and
      (ii) supplying SiCl₄ to an outer flame of the first double-layer flame burner, wherein the flow rate of the SiCl₄ supplied to the outer flame is 3 to 6 times the flow rate of the GeCl₄ supplied to the inner flame;
   (b) synthesizing glass soot particles from a second flame burner to form the center core of the preform by supplying SiCl₄ and GeCl₄ to the flame of the burner; and
   (c) depositing the generated glass soot particles on the lower end of a rotating starting member and growing the porous preform by:
      directing the first double-layer flame burner to the surface of the preform; and
      directing the second flame burner to the center core of the preform.

2. The method of claim 1, wherein:
   the step of synthesizing soot from a double-layer flame burner is synthesizing soot from a multi-port burner; and
   the step of synthesizing soot from a flame burner to form a core of the preform is synthesizing soot from a single flame burner.

3. A method according to claim 1, wherein the second flame burner is a single flame burner.

* * * * *